(12) United States Patent
Niemela

(10) Patent No.: US 9,490,986 B2
(45) Date of Patent: Nov. 8, 2016

(54) AUTHENTICATING A NODE IN A COMMUNICATION NETWORK

(75) Inventor: Jarno Niemela, Espoo (FI)

(73) Assignee: F-Secure Corporation, Helsinki (FI)

( * ) Notice: Subject to any disclaimer, the term of this patent is extended or adjusted under 35 U.S.C. 154(b) by 256 days.

(21) Appl. No.: 13/259,479

(22) PCT Filed: Apr. 7, 2010

(86) PCT No.: PCT/EP2010/054571
§ 371 (c)(1),
(2), (4) Date: Dec. 5, 2011

(87) PCT Pub. No.: WO2010/115913
PCT Pub. Date: Oct. 14, 2010

(65) Prior Publication Data
US 2012/0079584 A1 Mar. 29, 2012

(30) Foreign Application Priority Data
Apr. 7, 2009 (GB) .................................. 0906002.1

(51) Int. Cl.
G06F 21/30 (2013.01)
G06F 21/33 (2013.01)
G06F 21/44 (2013.01)
H04L 9/32 (2006.01)
H04L 29/06 (2006.01)

(52) U.S. Cl.
CPC ......... *H04L 9/3263* (2013.01); *H04L 63/0823* (2013.01); *H04L 63/1466* (2013.01); *H04L 9/3268* (2013.01)

(58) Field of Classification Search
CPC ............... H04L 9/3263; H04L 9/3268; H04L 63/0823; H04L 63/1466
USPC .................... 726/4–10, 26–29; 713/155–156
See application file for complete search history.

(56) References Cited

U.S. PATENT DOCUMENTS

| | | | |
|---|---|---|---|
| 7,500,100 B1 * | 3/2009 | Kobozev et al. ............. | 713/168 |
| 7,739,494 B1 | 6/2010 | McCorkendale et al. | |
| 7,886,344 B2 * | 2/2011 | Wei .......................... | H04L 45/00 726/6 |
| 8,327,131 B1 | 12/2012 | Hardjono et al. | |
| 8,677,466 B1 * | 3/2014 | Chuang ................... | H04L 9/321 709/229 |
| 2002/0087858 A1 | 7/2002 | Oliver et al. ................. | 713/156 |
| 2003/0097592 A1 * | 5/2003 | Adusumilli ............. | H04L 63/04 726/4 |

(Continued)

FOREIGN PATENT DOCUMENTS

| | | |
|---|---|---|
| CN | 101136748 A | 3/2008 |
| CN | 101272616 A | 9/2008 |
| EP | 2020798 A2 | 7/2008 |
| WO | WO 2004/114586 A1 | 12/2004 |

*Primary Examiner* — Linglan Edwards
(74) *Attorney, Agent, or Firm* — Harrington & Smith

(57) ABSTRACT

A method and apparatus for authenticating a first node's identity in a communication network. An authentication node receives from a second node an authentication request. The authentication request includes a first certificate that has previously been presented to the second node by a node purporting to be the first node. The authentication node retrieves a second certificate belonging to the first node from the first node, and compares the first certificate with the second certificate. If the certificates match, then the first node's identity can be authenticated but if the certificates do not match, then the first node's identity cannot be authenticated. The results of the comparison are then sent to the second node for use by the second node to authenticate the first node.

14 Claims, 4 Drawing Sheets

(56) References Cited

U.S. PATENT DOCUMENTS

| | | | |
|---|---|---|---|
| 2003/0237004 A1 | 12/2003 | Okamura | 713/201 |
| 2005/0138351 A1 | 6/2005 | Lee et al. | 713/151 |
| 2006/0048225 A1* | 3/2006 | Gomez | G06F 9/4443 726/22 |
| 2006/0161975 A1* | 7/2006 | Diez | H04L 63/0823 726/18 |
| 2008/0133907 A1* | 6/2008 | Parkinson | H04L 63/0823 713/158 |
| 2008/0148045 A1* | 6/2008 | Shen | H04L 9/3268 713/156 |
| 2009/0063855 A1* | 3/2009 | Parkinson | H04L 63/20 713/158 |
| 2010/0138907 A1* | 6/2010 | Grajek | H04L 9/3263 726/10 |
| 2010/0146250 A1 | 6/2010 | Bergerson et al. | |
| 2010/0325429 A1* | 12/2010 | Saha et al. | 713/158 |
| 2012/0054847 A1 | 3/2012 | Schultz et al. | |
| 2014/0095866 A1 | 4/2014 | Grebennikov et al. | |

* cited by examiner

AUTHENTICATING A NODE IN A COMMUNICATION NETWORK

FIELD OF THE INVENTION

The present invention relates to authenticating nodes in a communication network.

BACKGROUND TO THE INVENTION

Use of communications networks such as the Internet to access secure services such as customer bank account details is now commonplace. However, it is important for the user that this type of access cannot be compromised by a malicious third party.

Transport Layer Security (TLS) and its predecessor Secure Sockets Layer (SSL) are commonly used protocols to enable information to be sent securely over the communication network. These protocols rely on authentication of a certificate to allow each party to authenticate themselves to other parties. Certificates are provided by a Certifying Authority (CA).

Consider the situation in which a user client accesses a secure server to, for example, access a user's bank account. When the user client accesses the server, the server presents its certificate to the user client. The user client validates the server's certificate. Note that if the user client is to be sure that the certificate comes from the same server, information identifying the server (such as a URL) should be included in the certificate. Only a trusted CA can include such information in the certificate, and so checking the information identifying the server against information identifying the server included in the certificate can be used by the client to identify that the certificate belongs to the server.

It is possible for a malicious third party to approach a CA claiming to represent someone else, and obtain a certificate. For example, a malicious third party in Brazil may approach a CA based in the UK, and claim to represent a Finnish bank. The malicious third party would present his own identifying information to be embedded in the certificate. The CA may not have the resources to perform comprehensive checks on the third party and simply issue a certificate on the basis of cursory checks. For example, the third party may obtain remote access to the Finnish bank's computer network and send an email to the CA that seems to come from an employee of the Finnish bank. There are several ways in which a malicious third party can trick a CA into issuing a certificate. The certificate obtained by the third party would therefore appear to be linked to the identification of a server of the Finnish bank when it in fact is linked to an identification of a server used by the third party.

Once a malicious third party has obtained a certificate, any communications between a client and the Finnish bank server become vulnerable to a so-called "man-in-the-middle" attack. In this type of attack, the malicious third party is an attacker and connects to both the client and to the server, as illustrated in FIG. 1. The attacker 1 impersonates the server 2 towards the client 3, and impersonates the client 3 towards the server 2, making the client 3 and sever 2 believe that they are communicating directly with one another. Even when the attacker 1 has obtained a certificate that incorporates identifying information the Server 2, the user's client 3 can be fooled into thinking that it is communicating with the Server 2 rather than the attacker 1.

SUMMARY OF THE INVENTION

It is an object of the invention to reduce the risk of man-in-the-middle attacks where an attacker uses a certificate including information identifying a server to impersonate the server.

According to a first aspect of the invention, there is provided a method of authenticating a first node's identity in a communication network. An authentication node receives from a second node an authentication request. The authentication request includes a first certificate that has previously been presented to the second node by a node purporting to be the first node. The authentication node retrieves a second certificate belonging to the first node by sending a request message to the first node and receiving a response from the first node that includes the second certificate belonging to the first node. A comparison is made between the first certificate and the second certificate. If the certificates match, then the first node's identity can be authenticated but if the certificates do not match, then the first node's identity cannot be authenticated. The results of the comparison are then sent to the second node.

The authentication node optionally stores information associated with the first certificate in the event that the certificates do no match. This can be used to further investigate man-in-the-middle attacks.

As an option, in the event that the received result of the comparison is that the first and second certificates do not match, the second node ceases any ongoing communication with the node purporting to be the first node.

As a further option, the authentication node retrieves a list of revoked certificates and compares the first certificate with certificates on the list of revoked certificates. If the first certificate matches a certificate on the list of revoked certificates, then the first node's identity is not authenticated.

As an option, the authentication node stores a record of queries from a plurality of remote nodes. The record includes certificates presented to each of the plurality of remote nodes by a node purporting to be the first node. After comparing the first certificate with the second certificate and determining that the certificates match, the authentication node compares the first certificate with certificates included in the record of queries and determines, on the basis of the comparison of the first certificate with certificates included in the record of queries, whether to authenticate the first node's identity. This ensures that the authentication node can take into account a possible DNS cache poisoning or other attack, or a change in the first node's certificate.

Optionally, in the event that the first certificate does not match at least some of the certificates included in the record of queries, first node's identity is not authenticated. Alternatively, in the event that the first certificate does not match at least some of the certificates included in the record of queries, the authentication node waits until a predetermined number of subsequent authentication requests relating to the first node have been received and compares the certificates included in the subsequent authentication requests with the first certificate. In the event that the certificates included in the subsequent authentication requests match the first certificate, the first node's identity can be authenticated, as it is likely that the difference between the first certificate and the certificates included in the record of queries is caused by the first node changing its certificate.

According to a second aspect of the invention, there is provided an authentication node for use in authenticating a first node's identity in a communication network. A first receiver is provided for receiving from a second node an authentication request, which includes a first certificate presented to the second node by a node purporting to be the first node. A transmitter is provided for sending to the first node a request message, and a second receiver is provided for receiving a response from the first node, the response including a second certificate belonging to the first node. A processor is also provided for comparing the first certificate with the second certificate and, in the event that the certificates match, authenticating the first node's identity and in the event that the certificates do not match, not authentication the first node's identity. In addition, a second transmitter is provided for sending the result of the comparison to the second node.

The authentication node optionally includes a memory for storing information associated with the first certificate in the event that the certificates do no match.

The memory is preferably arranged to store a record of queries from a plurality of remote nodes, the record including certificates presented to each of the plurality of remote nodes by a node purporting to be the first node. In this case, the processor is arranged to, after comparing the first certificate with the second certificate and determining that the certificates match, compare the first certificate with certificates included in the record of queries. The processor is further arranged to determine on the basis of the comparison of the first certificate with certificates included in the record of queries whether to authenticate the first node's identity.

According to a third aspect of the invention, there is provided a client device for use in a computer network. A first receiver is provided for receiving a certificate from a node purporting to be a first node. A first transmitter is provided for sending to an authentication server an authentication request, the authentication request including the certificate. A second receiver is arranged to receive from the authentication server an authentication result, the authentication result including an indication of whether the certificate is associated with the first node. A processor is provided for terminating communication with the node purporting to be the first node in the event that the authentication result includes an indication that the certificate is not associated with the first node.

According to a fourth aspect of the invention, there is provided a computer program, comprising computer readable code which, when run on an authentication node, causes the authentication node to behave as an authentication node as described above in the second aspect of the invention.

According to a fifth aspect of the invention, there is provided a computer program product comprising a computer readable medium and a computer program as described above in the fourth aspect of the invention, wherein the computer program is stored on the computer readable medium.

According to a sixth aspect of the invention, there is provided a computer program, comprising computer readable code which, when run on a client device, causes the client device to behave as a client device as described above in the third aspect of the invention.

According to a seventh aspect of the invention, there is provided a computer program product comprising a computer readable medium and a computer program according to claim 11, wherein the computer program is stored on the computer readable medium.

DETAILED DESCRIPTION OF CERTAIN EMBODIMENTS

The following description discusses the invention in the environment of Secure Sockets Layer (SSL) protocols used in the Internet, but it will be appreciated that it can apply equally to other types of security protocol that rely on certificates, and to other types of communication network.

Figure 1:
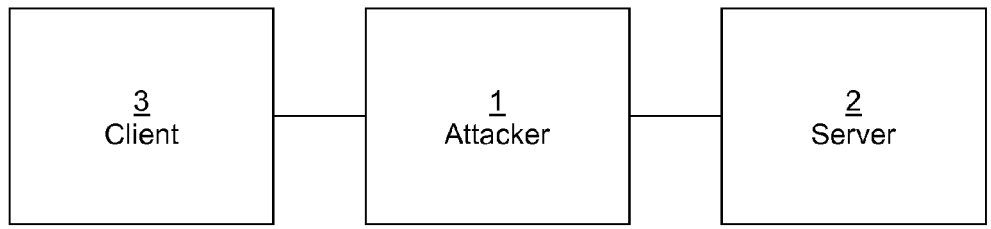
FIG. 1 illustrates schematically in a block diagram a man-in-the-middle attack between a client and a server.
Figure 2:
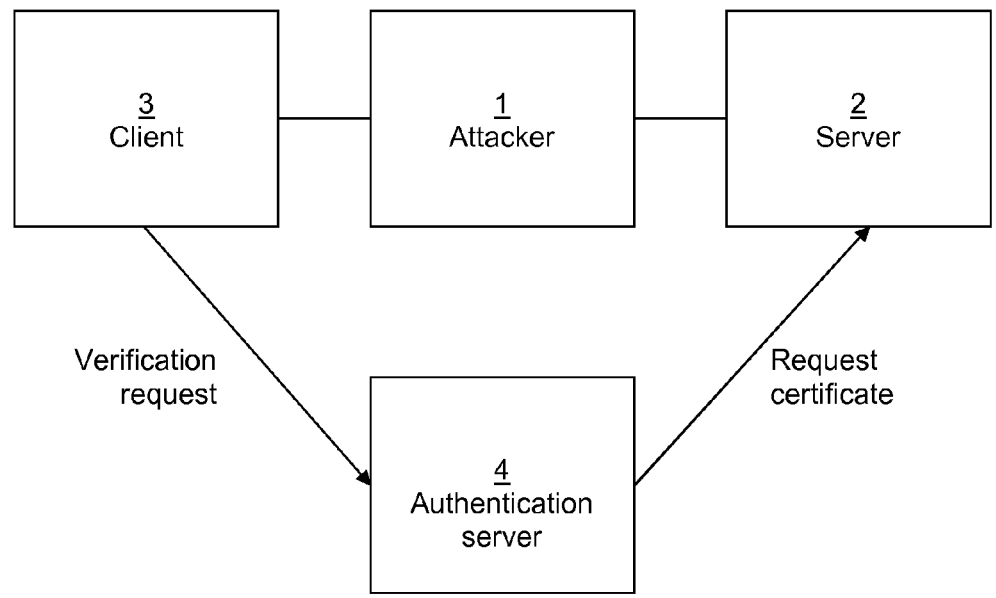
FIG. 2 illustrates schematically in a block diagram a network architecture and signalling according to an embodiment of the invention.

Referring to FIG. 2, a third party authentication server 4 is provided that can connect to both the client 3 and the server 2. In this example, an attacker 1 uses Domain Name System (DNS) poisoning to provide false data to a Domain Name Server (not shown). The Domain Name Server caches information in order to improve its performance, and so will also cache the false information. In this case, the Domain Name Server has the server of the attacker's domain redirected to the server 2. In this way, anyone who uses the Domain Name Server to perform a DNS lookup for the server 2 will obtain the attacker's domain name rather than the server's 2 domain name.

The client 3 subsequently performs a DNS lookup in order to contact the server 2, and because the Domain Name Server has been poisoned, receives the attacker's 1 domain name. The client 3 then contacts the attacker 2 in the belief that he is contacting the server 2, and is unaware that he is really communicating with the attacker 1.

The SSL protocol is used for the client 3 to validate the server's 3 certificate. The attacker 1 sends the client 3 the attacker's certificate, and the client 3 checks the digital signatures of the attacker's certificate. Because the attacker's certificate was fraudulently obtained from a CA, the certificate is validated, and the client now believes that it can communicate securely with the server 2 when it is in fact communicating with the attacker 1.

According to the invention, out of band authentication is used to provide a further check on the certificate presented by the attacker. When the SSL connection is opened between the client 3 and the server 2, or the client 3 and the attacker, an authentication request is sent to the third party authentication server 4. The authentication request contains the server's 2 certificate.

When the authentication server 4 receives the authentication request, it contacts the server 2 to obtain the server's certificate. The server 2 replies to the authentication server 4 with its certificate. Note that the authentication server may already have knowledge of the server's certificate (for example, if it has been statically provisioned or provided to the authentication server 4 in a previous request). The authentication server 4 then compares the server certificate received from the client 3 in the authentication request with the server certificate received from the server 2. If there is no man-in-the-middle attack, and the client 3 is communicating directly with the server 2, then the certificates are identical and the authentication server 4 can report to the client 3 that the server 2 is authenticated and can be trusted. If, on the other hand, the certificates do not match, the authentication server 4 reports to the client 1 that the client 1 has been presented with a fraudulent certificate and the connection with the attacker 1 should be closed.

The authentication server 4 may also retrieve lists of revoked certificates from one or more CAs. The server certificate can be compared with entries in the revoked certificates list. If a match is found, then the authentication server 4 is aware that the server's certificate is revoked, and reports to the client 1 that the client has been presented with a revoked certificate.

The authentication server 4 can perform additional tasks, such as data mining, to look for patterns where certificates are presented by the same attacker 1. This data can be used for detecting any unusual activity that may be further researched by the operators of the authentication server 4 to predict new forms of misuse be they become common knowledge. Furthermore, the authentication server 4 can apply rules to determine circumstances in which it is more likely that a client 3 is subject to a man in the middle attack. For example, a company may have a server based in the UK, and has previously presented certificates identifying the UK server. If a certificate purporting to be from the company is presented by the client, and the certificate identifies a server in China, it is more likely that the client is subject to a man in the middle attack.

Figure 3:
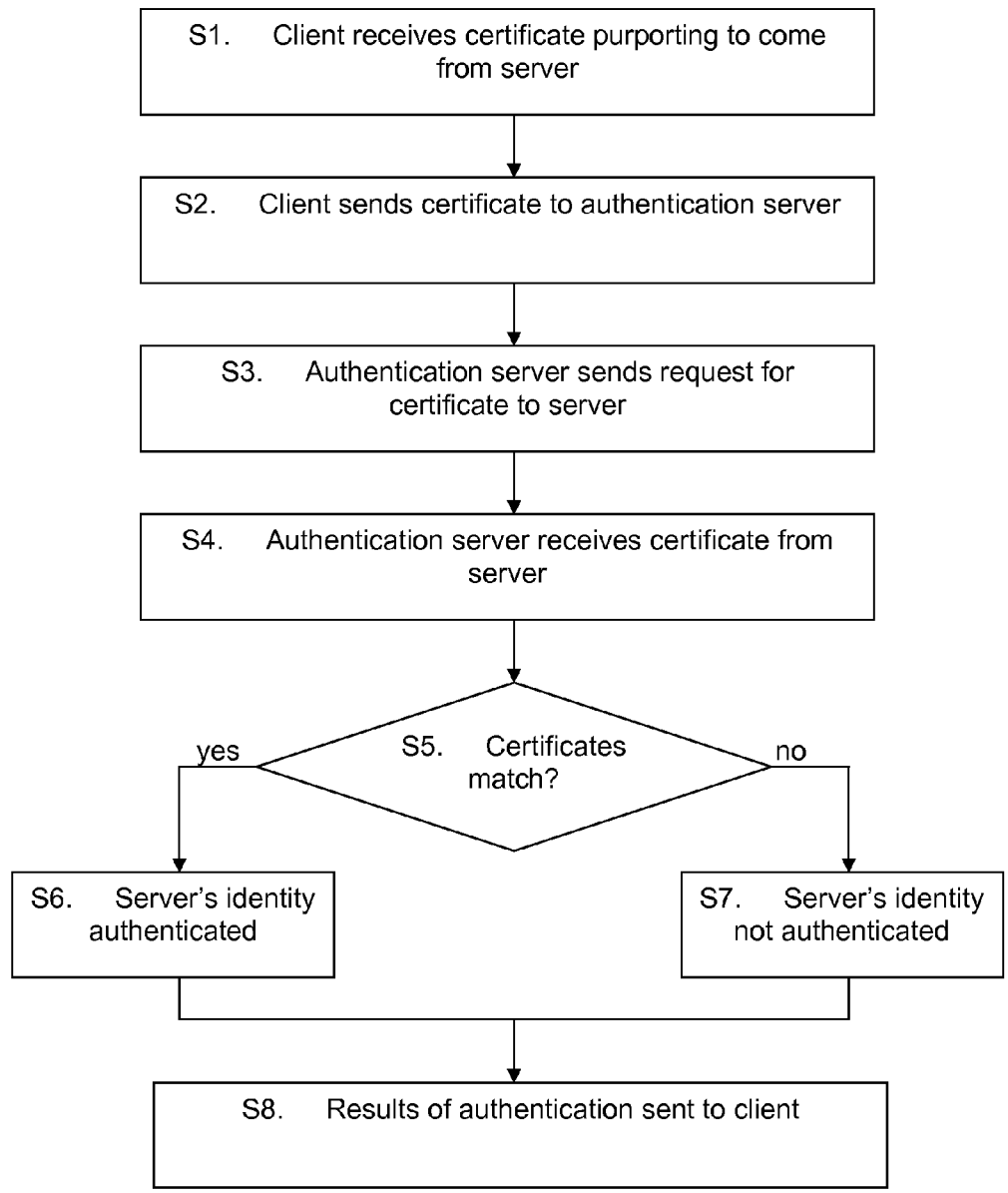
FIG. 3 is a flow diagram showing the steps of an embodiment of the invention.

FIG. 3 is a flow diagram illustrating steps of the invention. The following numbering corresponds to the numbering of FIG. 3:

S1. The client 3 receives a certificate purporting to come from the server 2. As the certificate has been fraudulently obtained from a CA, initial SSL checks determine that the certificate can be trusted.

S2. The client 3 sends the certificate to the authentication server 4.

S3. The authentication server 4 sends a message to the server 2 requesting a copy of the server's certificate.

S4. The server 2 responds with a copy of its certificate.

S5. A comparison is made of the certificate received from the client 3 with the certificate received from the server 3.

S6. If the certificates match, then the certificate presented to the client 3 is valid and the server's 2 identity can be authenticated.

S7. If the certificates do not match, then the certificate presented to the client 3 is not valid and the server's 2 identity is not authenticated.

S8. The results of the authentication are sent back to the client 4.

In a further embodiment of the invention, it is possible that the authentication server 4 is targeted by a malicious third party using DNS cache poisoning or another attack. In this case, the authentication server 4 would also receive the fraudulent certificate. In order to address this, the authentication server 4 may maintain a query record 18 stored in the memory 16. The query record includes records of queries from all client nodes, including the certificates received from the server 2 (and other servers). In the event of a DNS poisoning attack, the certificate sent to the authentication server 4 from the client 3 will also match the certificate obtained from the server 2, even where the certificate is fraudulent. In order to reduce this risk, the authentication server 4 may perform a further check by comparing the certificate received from the client 3 with a certificate for the server 2 stored in the query record 18 from a previous query relating to that server. If the comparison indicates that the two certificates are different, then the authentication server 4 can perform a check to ascertain whether a DNS poisoning attack has occurred or whether the server 2 has started using a new certificate.

The check may be in the form of alerting a user to determine whether a DNS poisoning attack has occurred or whether the server 2 has started using a new certificate. Alternatively, the authentication server 4 takes no action and waits until a predetermined number of queries relating to the server 2 but from different clients has been received. If all of the subsequent queries use the same certificate as that presented by the server 4 to the client 3, it can be assumed that the server 2 is simply using the new certificate and the query record 18 and be updated.

The query record may be used to perform a statistical analysis, such that a check to ascertain whether a DNS poisoning attack has occurred or whether the server 2 has started using a new certificate occurs when a certain proportion of queries from clients use a different certificate to that stored in the query record.

Figure 4:
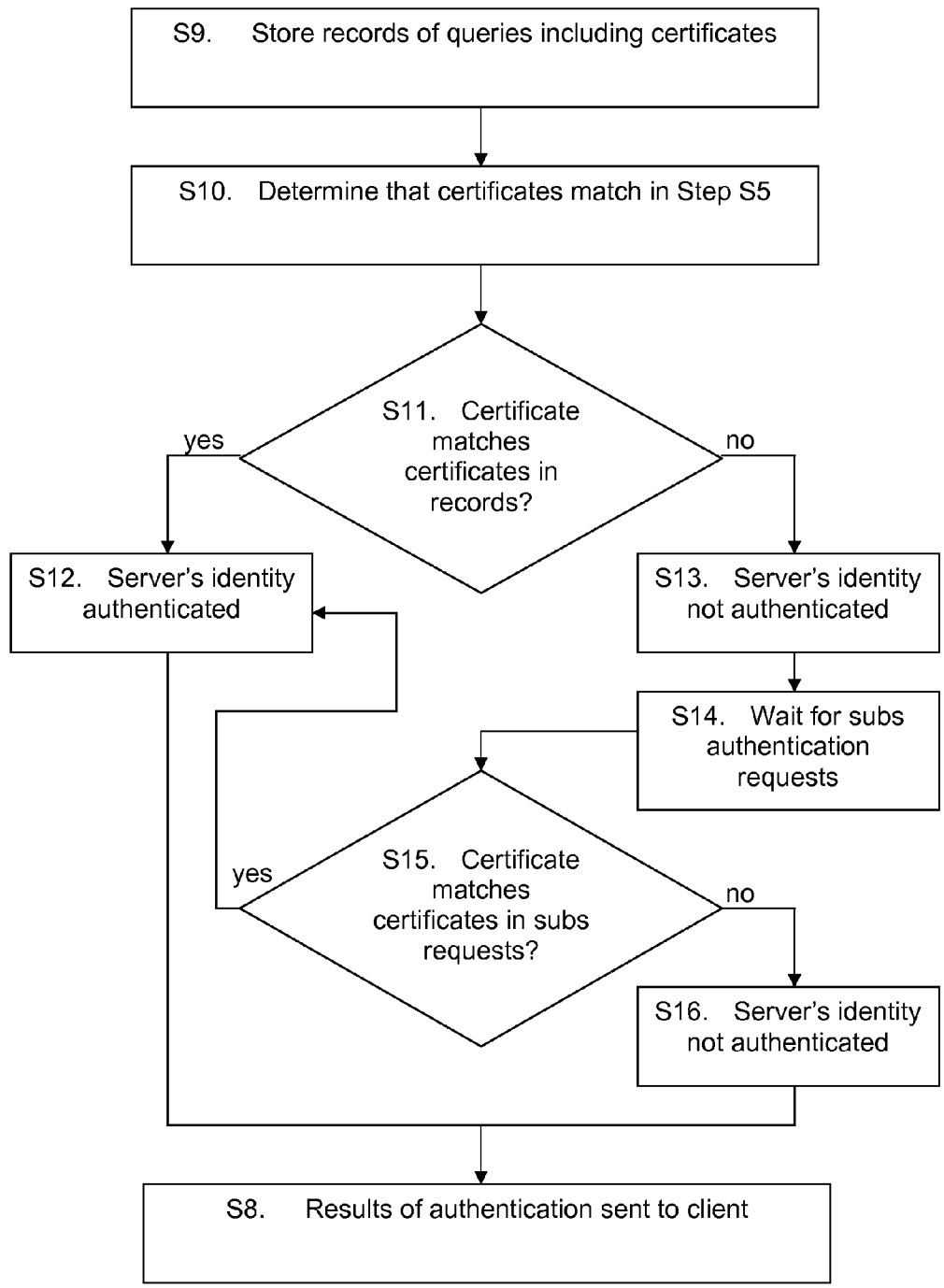
FIG. 4 is a flow diagram illustrating the steps of a further embodiment of the invention.

FIG. 4 is a flow diagram illustrating a further embodiment of the invention. The following numbering corresponds to that of FIG. 4:

S9. The authentication server 4 stores query records from a plurality of clients, the query including certificates purporting to come from the server 2.

S10. A determination is made that the certificate sent in the authentication request from the client 3 matches that received from the server 2, as described in step S5 above.

S11. A comparison is made between the certificate sent by the client 3 (this could equally be the certificate provided by the server 2) with certificates stored in the query records.

S12. If the certificate matches the certificates stored in the query records, or a predetermined proportion of the certificates stored in the query records, then the server's identity is authenticated, and the results of authentication are sent to the client as in step S8.

S13. If the certificate does not matches the certificates stored in the query records, or a predetermined proportion of the certificates stored in the query records, then the server's identity is not authenticated. The results of the authentication may be sent to the client as in step S8, or alternatively proceed to step S14

S14. The authentication server waits for a predetermined number of subsequent authentication requests from other clients.

S15. After receiving a predetermined number of subsequent authentication requests from other clients, a determination is made to see whether the certificate sent by the client 3 (or the one provided by the server 2) matches a sufficient proportion of certificates in the subsequent requests. If so, then the server's identity is authenticated and the method proceeds to step S12. If not, then the method proceeds to step S16.

S16. The server's identity is not authenticated.

S8. The results of the authentication are sent from the authentication server 4 to the client 2.

Figure 5:
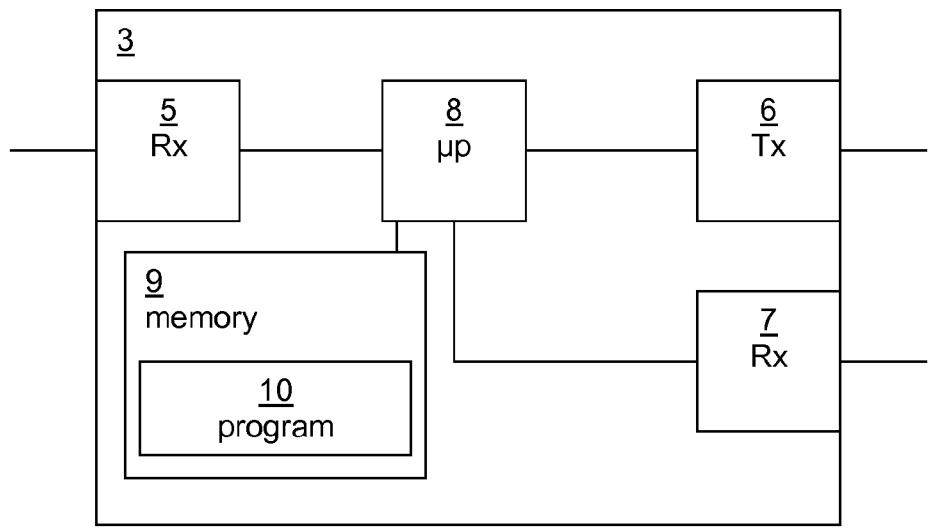
FIG. 5 illustrates schematically in a block diagram a client node according to an embodiment of the invention.

Turning now to FIG. 5, a client node 3 is illustrated. The client node 3 is provided with a first receiver 5 for receiving a certificate from a node purporting to be the server 2. A first transmitter 6 is provided for sending an authentication request to the authentication server 4. A second receiver 7 is provided for receiving the results of the authentication check from the authentication server 4. A processor 8 controls the signalling and is arranged to terminate communication with the node purporting to be the server 2 in the event that the authentication result indicates that the certificate is not associated with the server 2. A memory 9 is also provided in the form of a computer readable medium, on which a program 10 may be stored. The program 10, when executed by the processor 8, causes the client node 3 to behave as described above.

Figure 6:
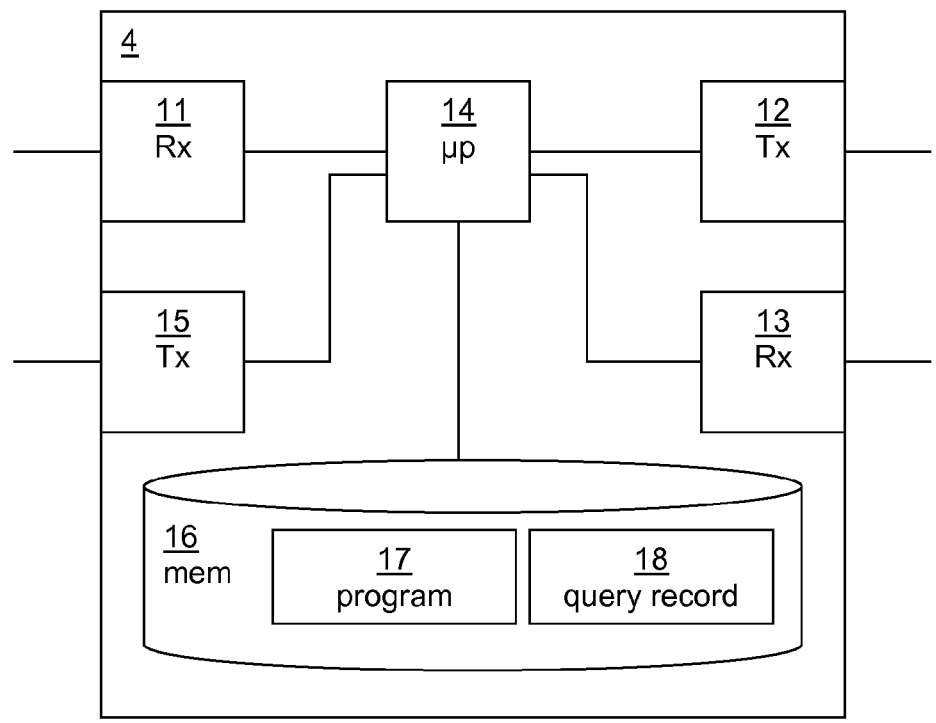
FIG. 6 illustrates schematically in a block diagram an authentication server according to an embodiment of the invention

An authentication server 4 is shown in FIG. 6. The authentication server 4 is provided with a first receiver 11 for receiving an authentication request from the client 3. The authentication request includes a first certificate purporting to be from the server 2. A first transmitter 12 is arranged to sending a request message to the server 2. A second receiver 13 is provided for receiving a response from the server 2, the response including the server's 2 certificate. A processor 14 is provided for comparing the received certificates. If the certificates match, the certificate presented to the client 3 can be authenticated, and if the certificates do not match, the certificate presented to the client 3 cannot be authenticated. A second transmitter 15 is provided for sending the result of the comparison to the client 3. The authentication node 4 may also have a memory 16 for storing information associated with the certificates. The memory 16 is in the form of a computer readable medium on which a program 17 may be stored. The program 17, when executed by the processor 14, causes the authentication server 4 to behave as described above.

It will be appreciated by the person of skill in the art that various modifications may be made to the above described embodiment without departing from the scope of the present invention. For example, whilst the above description refers to a client node attempting to authenticate a server's certificate, it will be appreciated that the method can be applied to any types of node in a communications network.

The invention claimed is:

1. A method of authenticating a first device's identity in a communication network, the method comprising:
at an authentication server of a computer network, receiving from a second device an authentication request, the authentication request including a first certificate presented to the second device by a node purporting to be the first device;
after receiving the authentication request, sending a request message to the first device;
receiving a response from the first device, the response including a second certificate belonging to the first device;
comparing the first certificate with the second certificate and, in the event that the certificates match, performing a further check by comparing the first certificate received from the second device with a third certificate stored in a query record from a previous query relating to the first device and if the first and third certificates match then authenticating the first device's identity and if the first and third certificates do not match performing another further check to authenticate the first certificate received from the second device, and in the event that the first and second certificates do not match, not authenticating the first device's identity; and
sending the result of the comparison to the second device for use by the second device to authenticate the first device.

2. The method according to claim 1, further comprising:
at the authentication server, storing information associated with the first certificate in the event that the certificates do not match.

3. The method according to claim 1, further comprising at the second device, in the event that the received result of the comparison is that the first and second certificates do not match, ceasing an ongoing communication with the node purporting to be the first device.

4. The method according claim 1, further comprising retrieving a list of revoked certificates; and
comparing the first certificate with certificates on the list of revoked certificates and, in the event that the first certificate matches a certificate on the list of revoked certificates, not authenticating the first device's identity.

5. The method according to claim 1, further comprising:
at the authentication server, storing a record of queries from a plurality of remote nodes, the record including certificates presented to each of the plurality of remote nodes by a device purporting to be the first device;
after comparing the first certificate with the second certificate and determining that the certificates match, comparing the first certificate with certificates included in the record of queries;
determining, on the basis of the comparison of the first certificate with certificates included in the record of queries, whether to authenticate the first device's identity.

6. The method according to claim 5, further comprising, in the event that the first certificate does not match at least some of the certificates included in the record of queries, not authenticating the first device's identity.

7. The method according to claim 5, further comprising, in the event that the first certificate does not match at least some of the certificates included in the record of queries:
waiting until a predetermined number of subsequent authentication requests relating to the first device have been received;
comparing the certificates included in the subsequent authentication requests with the first certificate; and
in the event that the certificates included in the subsequent authentication requests match the first certificate, authenticating the first device's identity.

8. The method according to claim 1, wherein the second device is a client device, and wherein the another further check comprises alerting the client device to determine whether a domain name server poisoning attack is occurring.

9. The method according to claim 1, where at least one of the first device and the second device comprises a client device of the computer network.

10. An authentication server for use in authenticating a first device's identity in a communication network, the authentication server comprising:
a first receiver for receiving from a second device an authentication request, the authentication request including a first certificate presented to the second device by a node purporting to be the first device;
a transmitter for sending to the first device a request message;
a second receiver for receiving a response from the first device, the response including a second certificate belonging to the first device;
a processor for comparing the first certificate with the second certificate and, in the event that the certificates match, performing a further check by comparing the first certificate received from the second device with a third certificate stored in a query record from a previous query relating to the first device and if the first and third certificates match then authenticating the first device's identity and if the first and third certificates do not match performing another further check to authenticate the first certificate received from the second device, and in the event that the certificates do not match, not authenticating the first device's identity; and a second transmitter for sending the result of the comparison to the second device for use by the second device to authenticate the first device.

11. The authentication server according to claim 10, further comprising a memory for storing information associated with the first certificate in the event that the certificates do not match.

12. The authentication server according to claim 10, wherein the memory is further arranged to store a record of queries from a plurality of remote nodes, the record including certificates presented to each of the plurality of remote devices by a device purporting to be the first device; and the processor is arranged to, after comparing the first certificate with the second certificate and determining that the certificates match, compare the first certificate with certificates included in the record of queries, wherein the processor is further arranged to determine, on the basis of the comparison of the first certificate with certificates included in the record of queries, whether to authenticate the first device's identity.

13. The authentication server according to claim 10, comprising a computer program, comprising computer readable code which when executed by a processor on the authentication server, causes the authentication server to perform operations as claimed in claim 10.

14. The authentication server according to claim 13, wherein the computer program is stored on a non-transitory computer readable medium.

* * * * *